April 28, 1959    A. H. LLOYD    2,883,915
BOX SETTING-UP MACHINE
Filed June 17, 1953    9 Sheets-Sheet 1

INVENTOR.
ALLEN H. LLOYD
BY
Joseph A. Rave
Attorney

INVENTOR.
ALLEN H. LLOYD
BY
Joseph A. Rave
Attorney

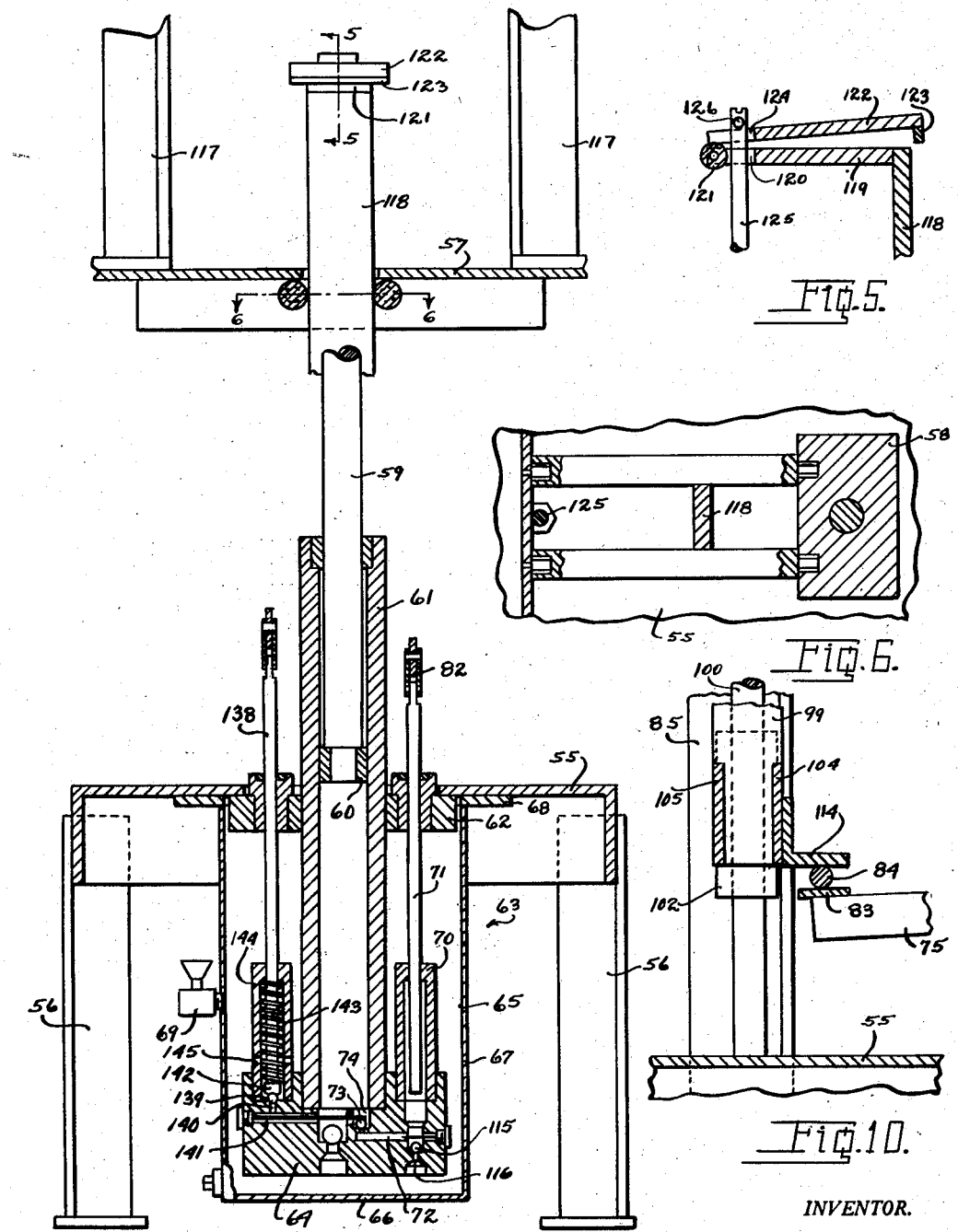

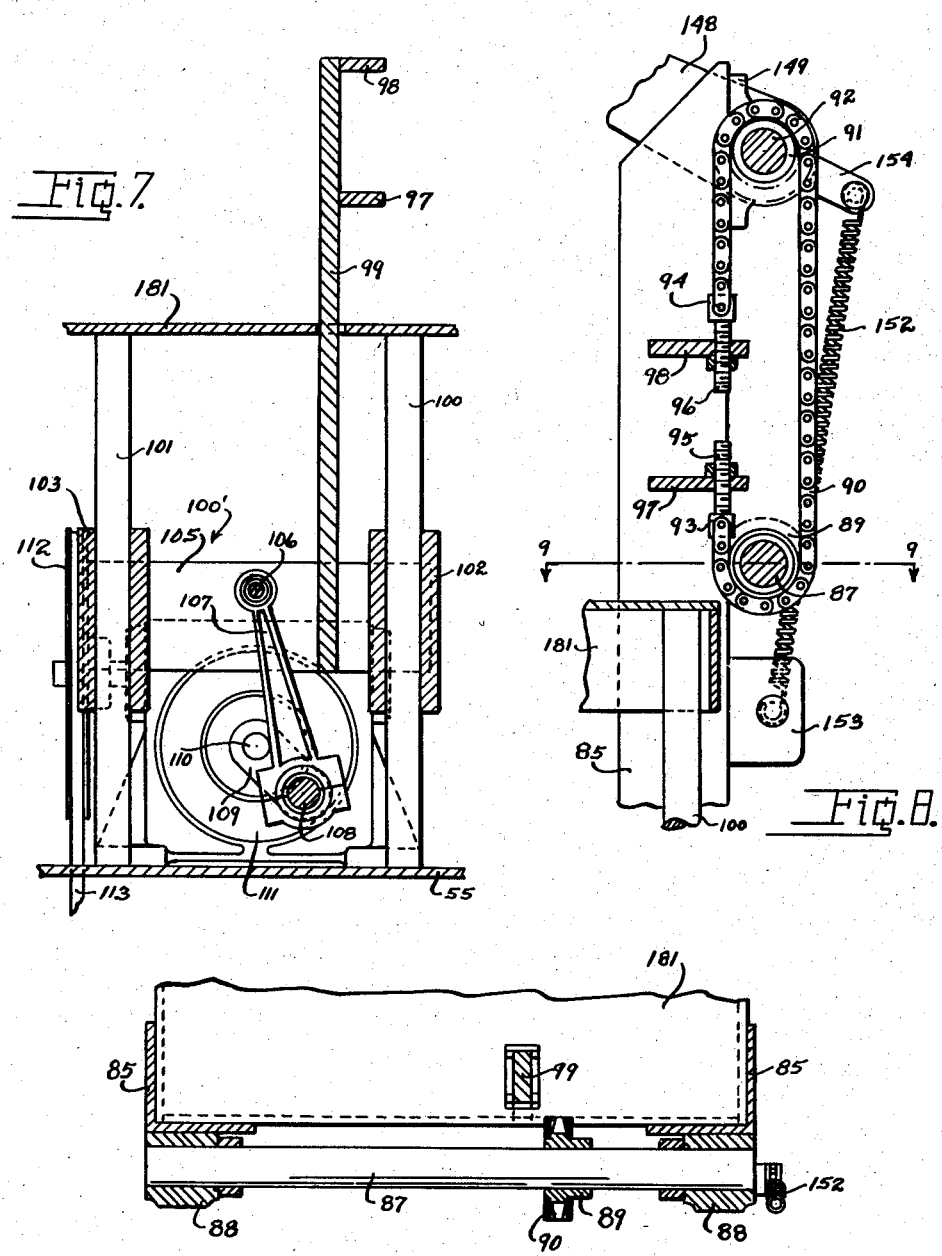

April 28, 1959 A. H. LLOYD 2,883,915
BOX SETTING-UP MACHINE
Filed June 17, 1953 9 Sheets-Sheet 5

INVENTOR.
ALLEN H. LLOYD
BY
Joseph A. Rave
Attorney

April 28, 1959     A. H. LLOYD     2,883,915
BOX SETTING-UP MACHINE

Filed June 17, 1953     9 Sheets-Sheet 6

INVENTOR.
ALLEN H. LLOYD
BY
Joseph A. Rave
Attorney

April 28, 1959 A. H. LLOYD 2,883,915
BOX SETTING-UP MACHINE
Filed June 17, 1953 9 Sheets-Sheet 7
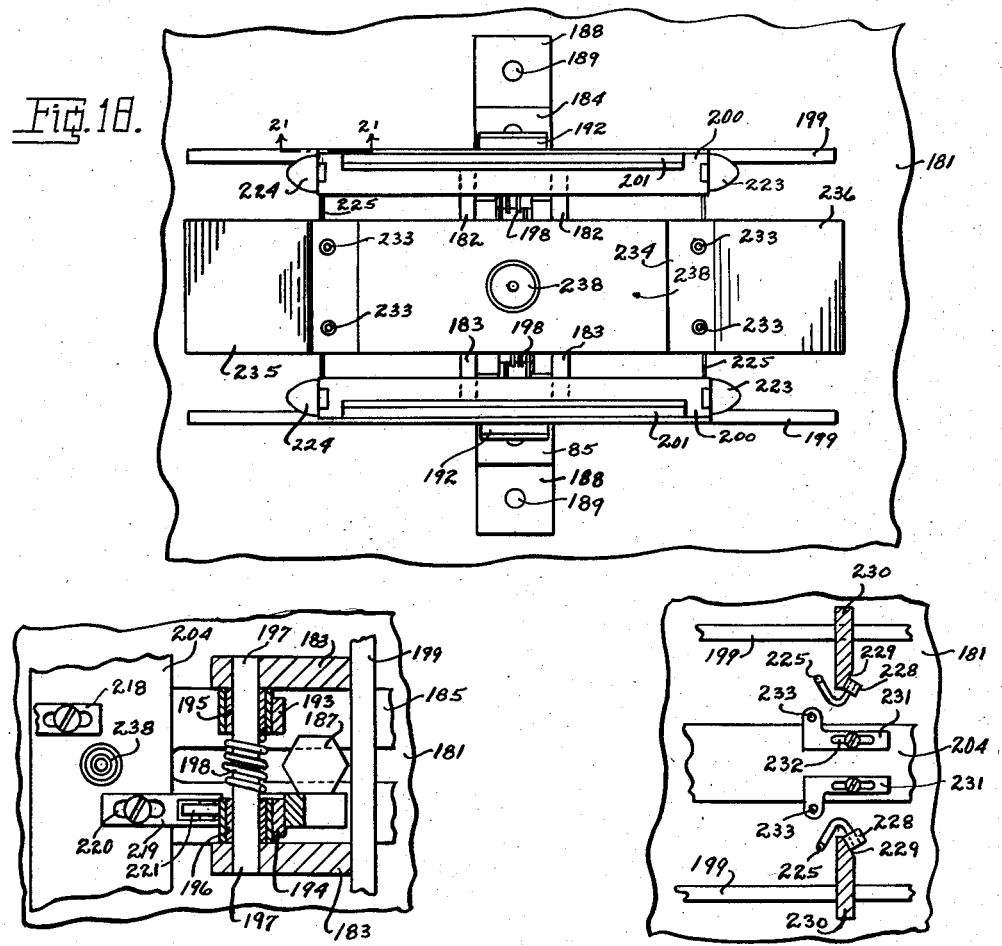
Fig.18.
Fig.19.
Fig.20.
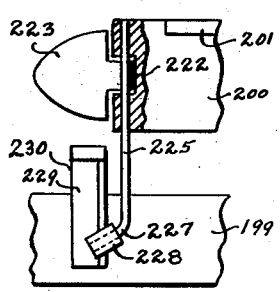
Fig.21.
INVENTOR.
ALLEN H LLOYD
BY
Joseph A. Rave
Attorney

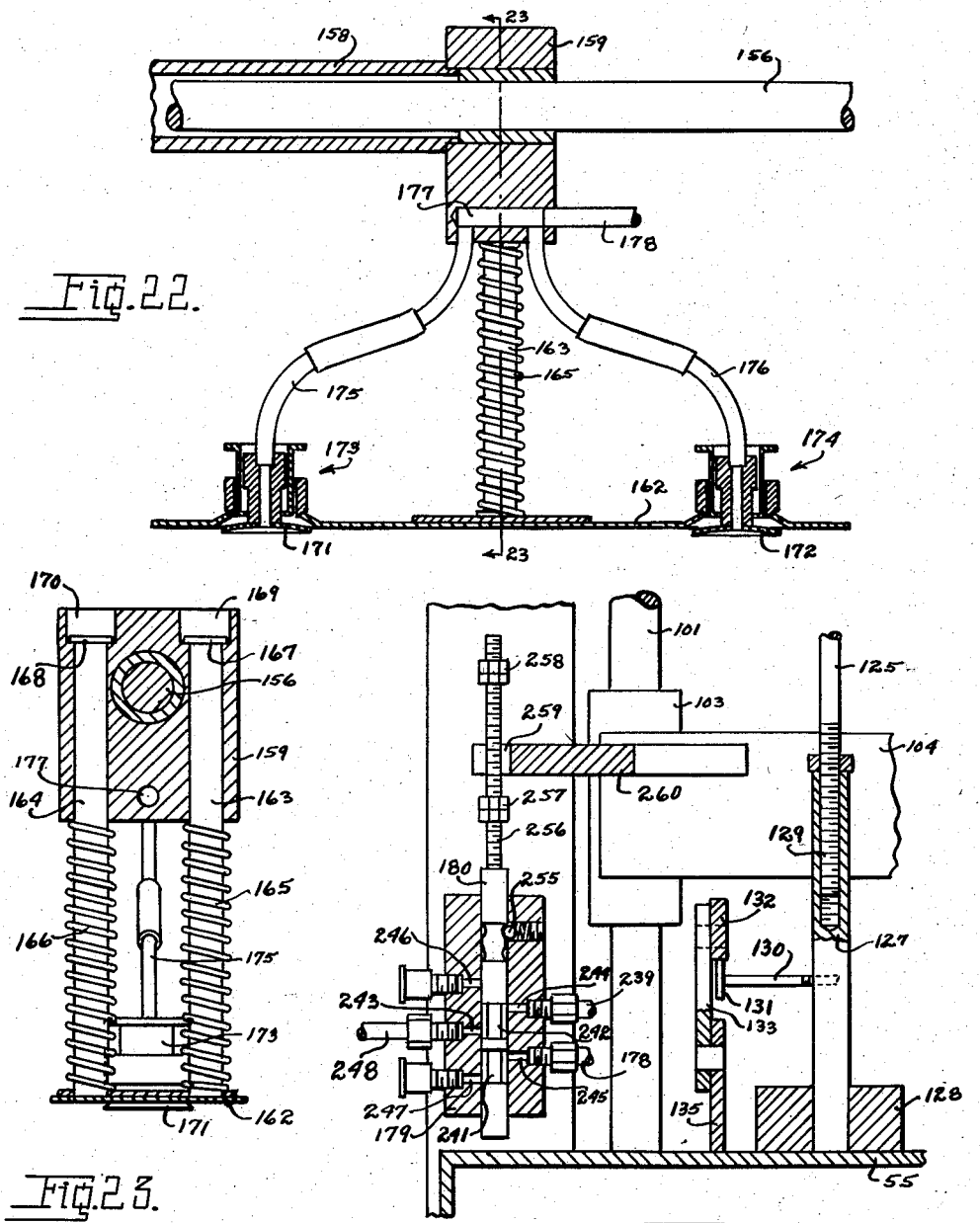

April 28, 1959     A. H. LLOYD     2,883,915
BOX SETTING-UP MACHINE
Filed June 17, 1953     9 Sheets-Sheet 9
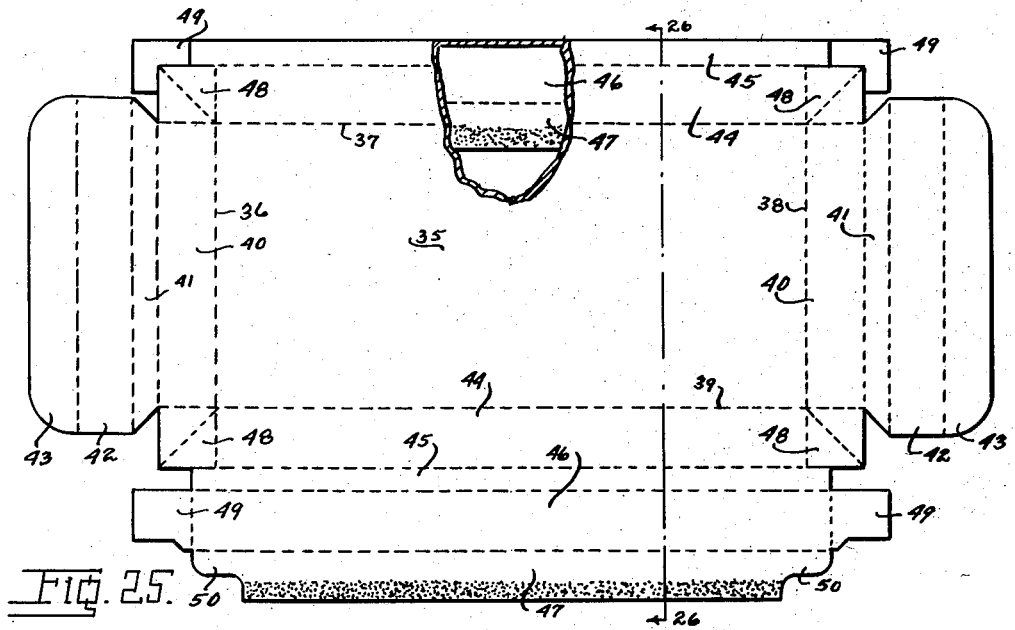
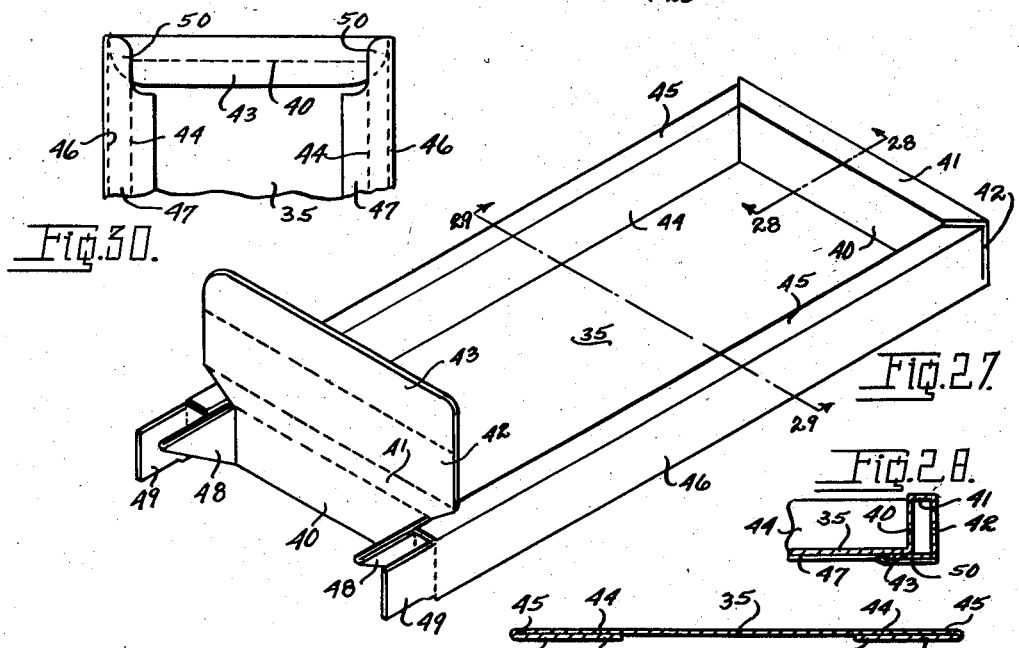
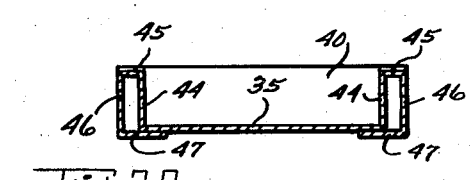
INVENTOR.
ALLEN H. LLOYD
BY
Joseph A. Rave
Attorney

United States Patent Office 2,883,915
Patented Apr. 28, 1959

2,883,915

BOX SETTING-UP MACHINE

Allen H. Lloyd, Terrace Park, Ohio, assignor to Tech-Art Inc., Milford, Ohio, a corporation of Ohio Application June 17, 1953, Serial No. 362,350

16 Claims. (Cl. 93—49)

This invention relates to improvements in a machine for setting-up boxes, that is, a machine for setting up a cardboard or paper box from its knocked down condition.

The machine of the present invention is for setting up blanks that have been cut to a predetermined configuration and is suitably scored to indicate where the various folds are to occur, that is, the side walls, end walls, tucking flaps, and the like.

Basically the blank is scored around a bottom panel with said scores integrally hingedly connecting to the bottom panel extensions which constitute or form the end and side walls for the box. In addition the blank may have connected with said side and end walls, again, through scores, extensions that constitute flaps that may be tucked within the carton proper or within the walls thereof for holding said walls in erected operative positions. The blank may in addition have flaps connected to certain of the walls which constitute the ultimate locking member for locking the carton in its finally set up or erected position.

The machine of the present invention is adapted for transferring a blank from a stack or pile to forming mechanism whereby the said box wall extensions are arranged in their proper operative positions and the said tucking flaps likewise arranged to their operative positions relative to the box walls. After the said box walls have been arranged they are locked in operative positions.

It is, therefore, the principal object of the present invention to provide a machine for automatically setting up the walls and tucking flaps of a box from a blank automatically brought thereto.

Another object of this invention is the provision of a machine which continuously operates for removing a box blank from a pile or stack and transferring it to an erecting or folding mechanism which automatically sets up the walls thereof relative to one another to have the said walls locked in said set up positions.

Another object of the present invention is the provision of a machine for accomplishing the foregoing objects in which the pile or stack of blanks is automatically fed to a definite position with respect to the transfer or feed mechanism.

A further object of the present invention is the provision of a machine for setting up a knocked down box or carton blank in a minimum of time and at a rapid rate.

A still further and specific object of this invention is the provision of a machine for setting up a knocked down box or carton blank in which the said set-up box or carton is provided with one or more hollow walls, that is, one or more walls having an outer wall member and an inner wall member spaced from one another but joined by a top wall member.

A still further object of the present invention is the provision of a machine for accomplishing the foregoing objects that is simple of construction, cannot readily get out of order, and can be operated successfully by substantially unskilled labor.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 4 is a vertical sectional view of an enlarged scale as seen from line 4—4 on Fig. 1 with certain parts in the background eliminated for clearance of illustration.

Fig. 5 is a fragmentary sectional view through a portion of Fig. 4 as seen from line 5—5 on said Fig. 4.

Fig. 6 is a fragmentary sectional view through a portion of Fig. 6 as seen from line 6—6 on said Fig. 4.

Fig. 7 is an enlarged fragmentary sectional view through a portion of the machine as seen from line 7—7 on Fig. 3.

Fig. 8 is an enlarged fragmentary vertical sectional view through a portion of the machine as seen from line 8—8 on Fig. 2.

Fig. 9 is a fragmentary horizontal sectional view through a portion of the machine as seen from line 9—9 on Fig. 8.

Fig. 10 is an enlarged fragmentary horizontal sectional view of a portion of the machine as seen from line 10—10 on Fig. 3.

Fig. 18 is a view similar to Fig. 17 of the parts in their positions to receive the blank and prior to the operation thereof as seen in Figs. 14 and 15.

Fig. 19 is a fragmentary enlarged sectional view of certain of the parts of the box setting up mechanism as seen from line 19—19 on Fig. 16.

Fig. 20 is an enlarged view partly in section and partly in elevation of certain of the parts of the box setting up mechanism as seen from line 20—20 on Fig. 14.

Fig. 21 is an enlarged fragmentary sectional view of certain parts of the box setting up mechanism as seen from line 21—21 on Fig. 18.

Fig. 22 is an enlarged fragmentary vertical sectional view through the blank transfer head as seen from line 22—22 on Fig. 12.

Fig. 23 is a view at right angles to Fig. 22 as seen from line 23—23 on said Fig. 22.

Fig. 24 is an enlarged vertical fragmentary sectional view through the pneumatic control valve for the blank transfer head as seen from line 24—24 on Fig. 3.

Fig. 25 is a plan view of a folded blank to be set up into a carton by the present machine, Fig. 25 showing a portion of the blank removed to illustrate the construction and said blank 25 being partially folded to its knocked down position.

Fig. 26 is a sectional view taken transversely of a completed knocked down blank as would be seen from line 26—26 on Fig. 25.

Fig. 27 is a perspective view of a carton as partially set up by the machine of the present invention and illustrating one end thereof as fully set up for locking the carton in its fully erected position.

Fig. 28 is a fragmentary sectional view through the fully erected end of the carton of Fig. 27 as seen from line 28—28 on said Fig. 27.

Fig. 29 is a transverse sectional view through a fully erected carton as seen from line 29—29 on Fig. 27.

Fig. 30 is a fragmentary bottom plan view of a fully erected end of the carton of Fig. 27.

Throughout the several views of the drawings similar reference characters are employed to denote the same or similar parts.

Figure 2:
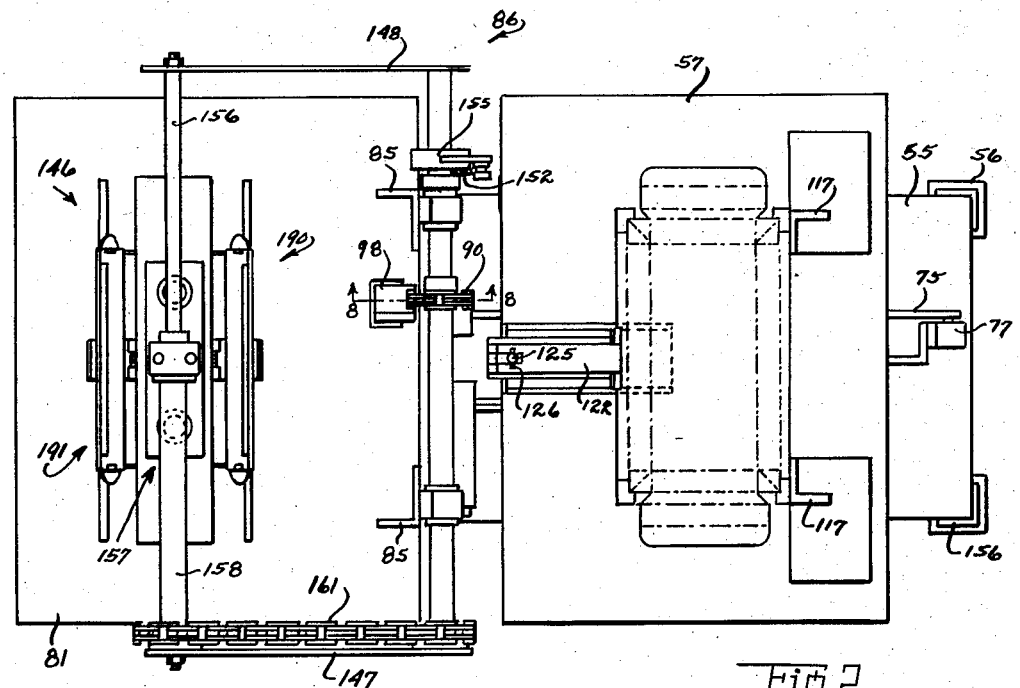
Fig. 2 is a top plan view of the machine in Fig. 1.

Before specifically describing the box or carton setting up machine it is deemed advisable to describe one type of box or carton which may be set up by the machine of the present invention, such a box or carton being illustrated in Figs. 25 to 30, inclusive, and also illustrated in plan in Fig. 2 in relation to the machine. It is to be understood that while a specific box or carton is illustrated in the drawings and is to be now described in relative detail, that this is not the only box or carton that can be set up on this machine but that this box or carton is to be regarded merely as an example, and the term box, hereinafter, is to include carton.

Specifically the box in Figs. 25 to 30, inclusive, is formed from a blank having substantially centrally thereof a bottom panel 35 bounded by score or fold lines 36, 37, 38 and 39 for integrally, hingedly connecting with the bottom panel end and side walls. The end walls are connected, respectively, through the score or fold lines 36 and 38 and each end wall comprises an inner wall member 40, a top wall member 41, an outer wall member 42, and a locking flap 43. The score or fold lines 37 and 39 each, respectively, connect with the bottom panel a side wall extension, with each side wall including an inner wall member 44, a top wall member 45, an outer wall member 46, and a combined bottom wall member and glue flap 47. It will be understood that each of the wall members of each end wall and each side wall are separated from one another by a score or fold line through which said members are folded to their respective operative positions.

Connecting the adjacent ends of the end walls inner wall members and the side walls inner wall members with one another are bellows corner pieces 48, each of which is foldable on itself and subsequently foldable to be substantially transversely of the finished box. Each of the side walls outer wall members has projecting from its opposite ends a tucking flap 49 which is to be disposed transversely of the erected box and enclosed within the end walls inner and outer wall members. It will be understood that the corner pieces and flaps are connected with the adjacent wall members by score or fold lines through which they are actuated to their operative positions.

The side walls glue flaps 47 are adapted to be adhesively secured to the under surface of the bottom panel 35 for the major portion of their length with, however, the reduced ends 50 thereof free of said bottom panel so as to receive the locking flaps 43 of the end walls, as illustrated in Fig. 30, and thereby lock the parts in box erected positions.

The blank is adapted to have each side wall extension secured in the position illustrated for the upper extension in Fig. 25 whereupon the blank has the plan as illustrated in Fig. 2 and a transverse cross-section as illustrated in Fig. 26, and it is from this position that the box is set up.

The mechanism for setting up the box blank, that is, positioning the side walls, end walls, and tucking flaps with respect to the bottom panel, comprises a bed 55 from the four corners of which depend legs 56 for upwardly spacing the bed from the supporting floor. The bed 55 may take any suitable or desirable form, that shown in the drawings being formed from a rectangular sheet of metal with the four sides thereof downwardly bent to form flanges each having its end edge secured to the end edge of the adjacent flange.

Figure 1:
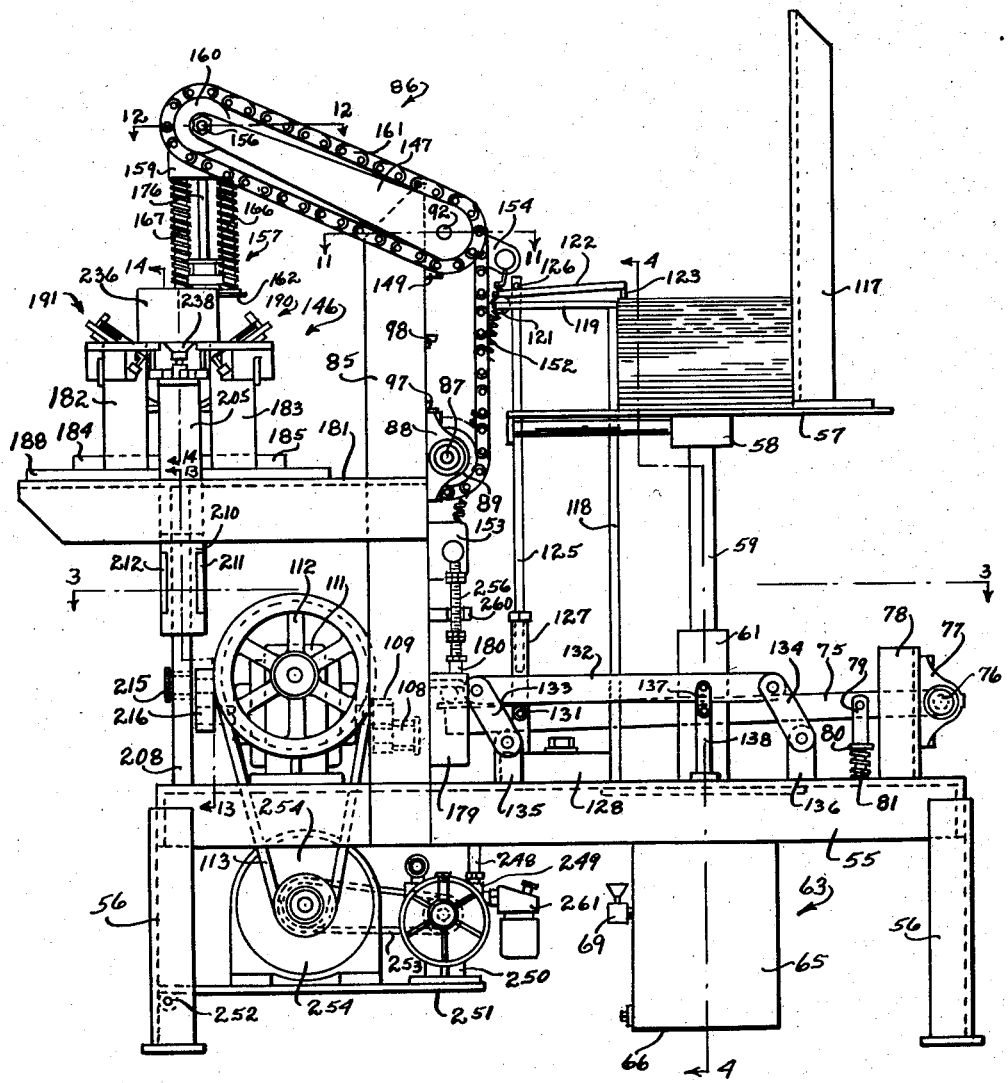
Fig. 1 is a side elevational view of a paper box set up machine incorporating the principles of the present invention.

Upwardly of the bed 55 and at its right hand end, as seen in Fig. 1, is the box blank supporting and feeding mechanism and comprises a vertically movable platform 57 having secured to its under surface at substantially its mid-point a depending block 58. The depending block 58 has secured therein to downwardly project therefrom a piston rod 59 which at its lower end carries a piston 60, see Fig. 4.

The piston 60 is disposed within a sleeve or cylinder 61 which is secured to and carried by a closure plate 62 of a pump mechanism, indicated in general by the reference numeral 63. The piston rod 59 extends upwardly of the cylinder 61 through a suitable packing carried by the upper end of said cylinder 61.

The lower end of the sleeve or cylinder 61 has secured thereto a valve housing 64 through which is formed valve controlled passageways as will presently be made clear. The said valve housing 64 and lower end of the sleeve or cylinder 61 is disposed within a sump or pump enclosing housing 65, in the form of a container having a bottom 66 from the periphery of which upstands the housing wall 67 with its upper end secured to the pump mechanism closure plate 62 and with said housing having a radially extending flange 68 through which it is secured to the under surface of the bed 55 to depend therefrom. The housing 65 is provided through its wall 67 with a filler connection 69 whereby oil or some other non-compressible, hydraulic medium is introduced into the housing 65. A suitable draining plug may be provided for draining the said housing.

Upstanding from said valve housing 64 is a pump sleeve or cylinder 70 in which operates a pump plunger 71 having its upper end connected with operating mechanism to be subsequently described. In practice, the housing 65 is provided with the hydraulic medium to a level at about the filling connection 69 and which level is well above the lower end of the pump plunger 71 as is obvious from an inspection of Fig. 4.

In practice, the plunger 71 is downwardly actuated for forcing an amount of hydraulic medium equal to its displacement from the pump cylinder 70 through port 72 to unseat valve 73 and force the medium through a port 74 into the piston cylinder 61 and thereby upwardly force the piston 60 and the parts carried thereby. It should be noted that, and as later will be made clear, the movement of the piston is incremental and is in the nature of the thickness of a box blank so as to maintain the box blank at a constant level above the bed 55. For accuracy in control of the position of the blank, and as later will be made clear, the parts are so adjusted that a slightly additional upward movement of the piston 60 and parts carried thereby is effected and which additional feed is subsequently accounted for.

Figure 3:
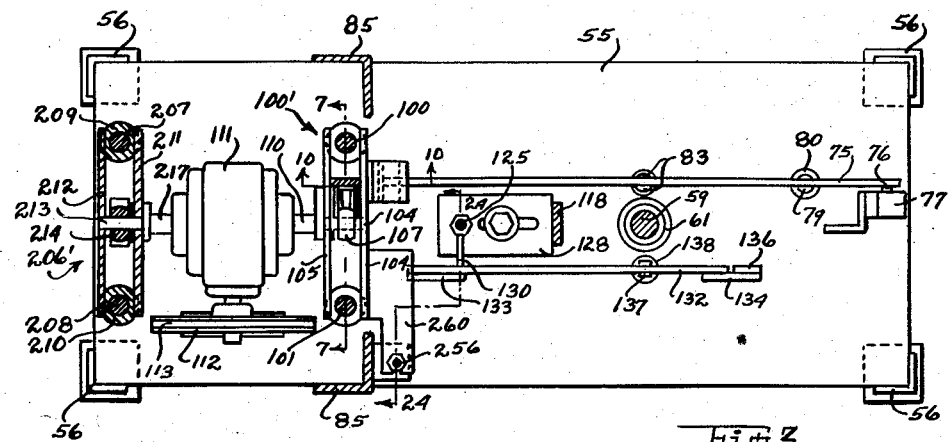
Fig. 3 is a horizontal sectional view through the machine with certain parts being shown in elevation as seen from line 3—3 of Fig. 1.

The pump plunger or piston operating mechanism is effected through a lever 75, see Figs. 1 and 2, which has its one end secured to a pivot pin 76 oscillatable in a bearing 77 secured to and carried by a short upstanding post 78 from the bed 55. Connected with the lever 75 at a point intermediate its ends is a guide pin 79 having a radial collar 80 forming one abutment for a spring 81 which surrounds the guide pin and which spring abuts on its other end with the bed plate 55. The guide pin 76 extends through and is guided by an aperture in the bed plate 55. This mechanism is for maintaining the lever 75 in a normal position which, in turn, maintains the pump plunger 71 in its desired operable position. The lever 75 is connected by links 82 at a point intermediate its ends with the pump plunger or piston 71, as clearly illustrated in Figs. 3 and 4. The other end of the lever 75, see Figs. 1, 3, and 10, is provided with a relatively short transverse treadle member 83 to which is welded or otherwise secured a cylindrical member or pin 84. The member 84 is in the form of a cylindrical member or pin so as to provide a line contact with the operating mechanism, as will presently be made clear.

Figure 11:
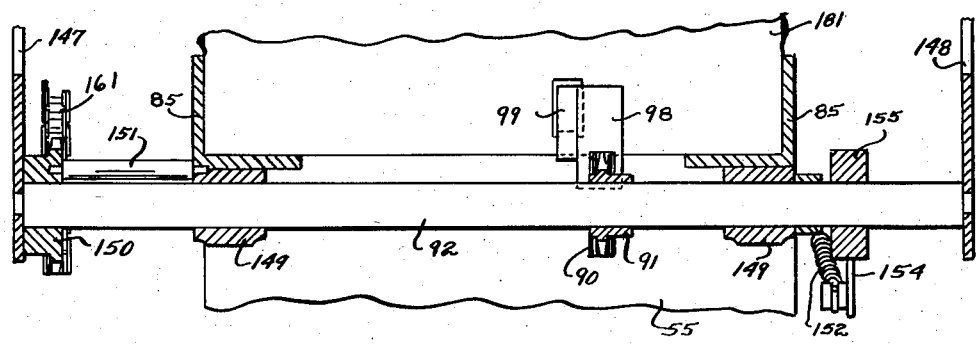
Fig. 11 is an enlarged fragmentary horizontal sectional view through the transfer mechanism actuating shaft as seen from line 11—11 on Fig. 1.

The bed 55 to the left of the blank elevating mechanism, as seen in Fig. 1, carries the box blank forming or setting up mechanism which includes a pair of upstanding posts 85 rising from the edges of the said table 55. The posts 85 extend upwardly above the box setting up mechanism and supports the blank transfer mechanism indicated in general by the reference numeral 86, see Fig. 1. The box transfer mechanism 86 comprises a driving shaft 87, illustrated most clearly in Fig. 9, and journaled in bearings 88 carried by the upstanding posts 85. The shaft 87 is held against axial movement relative to the bearings 88 by any suitable or desirable means and has keyed or otherwise secured thereto at a point, preferably intermediate the bearings 88, a sprocket 89. The sprocket 89, see Fig. 8, has extending therearound a sprocket chain 90 which in turn extends around a sprocket 91 keyed or otherwise secured to an oscillatable shaft 92 which forms the actuating shaft of the transfer mechanism and is clearly illustrated in Fig. 11. The sprocket chain 90, after passing around sprocket 89, has its one end 93 connected, through a stud 95, to a finger 97 and said sprocket chain 90, after passing around sprocket 91, has its other end 94 connected, through a stud 96, to a finger 98. The fingers 97 and 98 are secured to and laterally project from a reciprocating member 99. The reciprocating member 99 and its fingers 97 and 98 through the sprocket chain 90 and sprockets 89 and 91 form, in effect, a reciprocating flexible rack for actuating the drive shaft and oscillating the actuating shaft of the transfer mechanism.

The mechanism for actuating the reciprocating member 99 may take any suitable or desirable form, that shown in the drawings being in the form, of what may be termed, a cross-head, since it is operated by a crank, indicated in its entirety by the reference numeral 100′, comprising a pair of posts 100 and 101 upstanding from the bed 55 on each of which is mounted a sleeve 102 and 103. The sleeves are connected with one another by means of a front strap plate 104 and a rear strap plate 105. The sleeves 102 and 103 together with the strap plates 104 and 105 constitute the reciprocating cross-head 100′ being guided by the posts 100 and 101.

The cross-head 100′ substantially midway of its length is provided with a pin 106 on which is journaled the upper end of a connecting rod 107. The lower end of the connecting rod 107 is journaled to a crank pin 108 outwardly projecting from a crank arm 109. The crank arm 109 is keyed or otherwise secured to shaft 110 projecting from one side of a speed reducer 111. The speed reducer 111 may, and in effect does, constitute a crank shaft for operating the cross-head. The speed reducer 111 crank shaft, has connected therewith a pulley 112 actuated through a belt 113 from a suitable source of motive power, an electric motor, disposed below the table 55, as illustrated in Fig. 1.

The cross-head 100′ for the box blank transfer mechanism constitutes the motive power for the platform pump and, as seen in Figs. 1, 3 and 10, has projecting therefrom, preferably from the tie plate 104, a foot member 114 which is conveniently in the form of a section of angle iron, and overlies the pump lever contact member 84.

The operation of the pump plunger or piston 71 is believed obvious from the foregoing since each time the transfer mechanism cross-head 100′ is at its lower end it depresses the far end of the lever 75 against the resistance of spring 81 for downwardly forcing pump piston 71 and forcing, as noted above, the hydraulic medium into the cylinder 61. Upon the reverse movement of the transfer mechanism cross-head, the spring 81 returns the lever 75 to its normal position and thereby returns the pump piston 71 to its normal position.

The movement of the lever 75 and pump piston 71 by the spring 81 creates a suction within the pump cylinder 70 which draws the outlet check valve 73 to its seat and at the same time unseats a second or inlet check valve 115 and effects, through the port or opening 116, the suction of the hydraulic medium from the housing 65 into the pump cylinder 70. In this manner the pump mechanism is maintained primed for immediate operation upon depression of the pump lever 75.

As will be noted from Figs. 1 and 2, the box blanks are disposed between a pair of upstanding posts 117 and an opposing central upstanding member 118. The member 118 performs a dual purpose, that of providing a guide for the platform 57 in its vertical movement to prevent angular or lateral displacement thereof and for supporting a control valve operating mechanism which controls the upward movement of the blanks for the purpose of maintaining definite the upper surface of the box blank stack. The member 118 has rearwardly projecting therefrom, see Figs. 1 and 5, an arm 119 having its rear end furcated to provide a recess 120 therein, see Fig. 2. Pivotally supported by the arm 119 and spanning the rear end of the recess is a sleeve or roller 121 to which is welded or otherwise secured a trigger 122 whereby said trigger 122 is correspondingly pivotally mounted, the trigger 122 is of a length slightly greater than that of the arm 119 wherefore it projects ahead of the said arm 119 and the guide member 118. Depending from the free end of the trigger 122 is a contact finger 123 that is at all times on the upper surface of the uppermost blank of the stack at the edge of said uppermost blank. The trigger 122 is, at its rear end, furcated to provide a recess 124 in alignment with the recess 120 in arm 119.

Depending through the aligned recesses 120 and 124 is a valve control rod 125 provided at its upper end with a transverse pin 126 which spans the recess 124 in the trigger 122, as shown in Fig. 2. As will be noted from Figs. 2 and 5, the valve control rod 125 is inwardly of the pivot roller 121, wherefore any movement imparted to the trigger 122, particularly upwardly, will be given to the valve control rod 125.

The valve control rod 125 depends, as seen in Figs. 1 and 24, to have its lower end threaded into a sleeve 127 which is guided in an aperture in a block 128 secured to the upper surface of the bed 55. In normal operation the sleeve 127 rests on bed 55 or on a solid abutment that may be provided by the block 128 and in this manner determines the position of the pin 126 and thereby the normal position of the trigger 122. The connection of the sleeve 127 and rod 125 is a threaded one as illustrated at 129 and is for the purpose of effecting an elongation of the effective length of the rod 125 and sleeve 127 for thereby adjusting the operating position of pin 126.

Outwardly extending from the sleeve 127 at a point upwardly of the bed 55 is a pin 130 carrying at its outer end a roller 131 underlying a link 132. The link 132 is pivotally connected at its opposite ends with arms 133 and 134 in turn pivotally connected with upstanding lugs 135 and 136 from the bed 55. The purpose of this arrangement is that the upward movement of the link 132 will be at all times in parallelism with the bed 55 as is obvious from Fig. 1.

Pivotally connected with the link 132, as by straps 137, intermediate its ends, is a valve stem 138 which, see Fig. 4, depends into the pump housing 65 to carry at its lower end a valve 139 controlling port 140, in the valve housing 64, that communicates with the piston sleeve or cylinder 61 by way of port 141. The valve stem 138 has at its lower end a head 142 to which is attached the valve 139 and the said head 142 forms an abutment for a coil spring 143 that encircles the valve stem 138 for a portion thereof within a valve stem guide sleeve 144 and the upper end of which guide sleeve constitutes a second abutment for the spring 143. The spring 143 maintains the valve 139 against its seat except when raised therefrom by the trigger 122, as will now be set forth.

As was noted above, the displacement of the pump plunger 71 by the operating treadle 114 is such as to exceed, slightly, the thickness of a box blank wherefore the piston 60 is caused to operate upwardly an amount greater than necessary to upwardly elevate the stack for a single box blank thickness. The parts are so adjusted that this excess amount of movement correspondingly raises the trigger 122 thereby raising the valve control rod 125 and through its pin 130 and roller 131 raises the link 132. Upward movement of the link 132 carries with it the valve stem 138 for unseating the valve 139. The unseating of the valve 139, in effect, permits the platform 57 and parts carried thereby to descend thereby forcing the hydraulic medium from the cylinder 61 through ports 141 and 140 past the valve 139 into the guide sleeve 144. Actually the platform is held stationary once the trigger 122 is raised to unseat the valve 139. Guide sleeve 144 is provided with an exhaust port 145 thereby permitting the hydraulic medium to be discharged into the pump housing 65 exteriorly of the valve housing 64. The platform 57 and parts connected therewith in their descent permit the trigger 122 to likewise descend thereby permitting the valve control rod 125 to descend and permitting the spring 143 to reseat the valve 139 and prevent further discharge from the cylinder 61. This maintains the upper surface of the box blank stack at a predetermined constant level.

The transfer mechanism 86 is operable from a position over the platform 57, where it picks up the uppermost box blank, to a position over the box folding mechanism, indicated in general by the reference numeral 146. The transfer mechanism is provided at each of the outer ends of the actuating shaft 92 with an arm 147 and 148. The shaft 92 is oscillatable in suitable bearings or journals 149 carried by the upstanding posts 85 and it is beyond these bearings that the arms 147 and 148 are secured to the shaft 92. Loosely mounted on one end of the oscillatable shaft 92 is a sprocket 150 with said sprocket being held against rotation by a pin 151 which has its one end anchored in the sprocket 150 and its other end anchored in the bearing 149 or adjacent posts 85, see Fig. 11.

It will be obvious that vertical reciprocation of the member 99 through the sprocket chain 90 effects rotary or oscillating movement of the shaft 92. Since the arms 147 and 148, as will presently be made clear, carry the transfer head which has some weight, the oscillation of the actuating shaft 92 is counterbalanced by a spring 152 which has its one end anchored to a lug 153 projecting from one of the posts 85 with said spring having its other end secured to the outer end of a finger 154 projecting from a collar 155 keyed or otherwise secured to the said actuating shaft, all as clearly illustrated in Figs. 8 and 11.

Carried by the outer end of the arms 147 and 148 is the transfer head mechanism indicated in general by the reference numeral 157', and which transfer head mechanism comprises a shaft 156 on which is mounted the transfer head indicated in its entirety by the reference numeral 157. The head 157 is adapted to be oscillated relative to the shaft 156 wherefore the shaft 156 has oscillatably journaled thereon a sleeve 158 extending from one of the arms, arm 147, for example, to the head 157 where the said sleeve 158 is secured to head block 159. The sleeve 158 adjacent the arm 147 has secured thereto a sprocket 160 which is in line with the sprocket 150 on the actuating shaft 92. Extending about said sprockets 150 and 160 is a sprocket chain 161.

It will be understood that since the arms 147 and 148 are secured to the actuating shaft 92 they oscillate with said shaft 92 and since the sprocket 150 is held against movement the sprocket chain 161 will be caused to travel around the said sprocket 150 and thereby rotate or oscillate the sprocket 160. The purpose of this arrangement is to maintain the transfer head 157 in a vertical position as it travels from its position over the stack to its position over the box folding mechanism.

The transfer head 157, in addition to the block 159, has a plate 162 connected with said block by means of pins 163 and 164 which are slidably mounted in the block 159. Encircling each of the pins 163 and 164 is a spring, respectively 165 and 166, each abutting on its lower end with the plate 162 and on its upper end with the head block 159. To prevent disassociation of the parts the said pins 163 and 164 are each provided at its upper end with an enlarged head, respectively 167 and 168, disposed in counter-sinks 169 and 170. The plate 162 is of an area substantially equal to the area of the box bottom panel 35 and the carton stack is positioned with respect to the machine so that the plate 62 is disposed over the said bottom panel of the uppermost stack blank. In order that the said transfer head 157 through its plate 162 will pick up the blank there is provided a pneumatic suction device on the said transfer head.

The pneumatic suction device may take any suitable or desirable form, that illustrated in the drawings comprising, as seen in Fig. 22, adjacent the opposite ends of the plate 62, a suction cup 171 and 172 each carried by a yieldable carrier, respectively indicated in its entirety by reference numerals 173 and 174. It will be appreciated that the transfer head is pushed on to the uppermost blank of the stack with considerable force to make sure that the blank and transfer head are connected with one another and since the said stack is non-yieldable, the yieldable connection between the plate 162 and block 159 is provided by the springs 165 and 166 and a yieldable connection is likewise provided in the suction cup carrier mechanisms 173 and 174.

In practice, the suction cups 171 and 172 are connected with a pneumatic or suction pump, wherefore the suction cup 171 has extending from it a flexible conduit 175 while the suction cup 172 has extending from it a similar flexible conduit 176. The flexible conduits 175 and 176 each terminate in a port or duct 177 in the transfer head 159, with said duct 177 having connected therewith one end of a flexible conduit 178 which has its other end connected to a pneumatic control valve, indicated in its entirety by the reference numeral 179.

The control valve 179 contains a piston type valve 180 movable to two operative positions for connecting a pneumatic pump with either the transfer head or with the box forming mechanism and which valve will be subsequently described in detail.

As was noted above, the transfer mechanism 86, particularly the transfer head 157, transfers the uppermost blank from the stack to the box setting up mechanism 146. This box setting up mechanism includes a shelf 181 extending to the left from the upright posts 85, as seen in Fig. 1. Upstanding from the shelf 181 are pillars arranged as opposed pairs 182 and 183 with each pair of pillars secured to a block, respectively 184 and 185, each of which blocks is, in turn, bolted through an elongated aperture 186 by a bolt 187 to a plate 188 mounted on the upper surface of the shelf 181. Each of the pairs of pillars 182 and 183 is adapted for adjustment toward and from the other through its elongated aperture 186 as well as through spaced tapped apertures in the plate 188 and adapted to receive the bolts 189. Each of the pairs of pillars 182 and 183 and the mechanism carried thereby is for folding a box side and are respectively indicated in their entirety by reference numerals 190 and 191, and since they are substantially identical it is deemed sufficient if but one of them be described in detail.

Accordingly, box side folding mechanism 190 comprises a relatively short oscillatable plate 192 having its lower end furcated or recessed to provide arms 193 and 194 welded or otherwise secured, respectively, to a sleeve 195 and 196. The sleeves 195 and 196 may be suitably bushed and journaled on a shaft 197 carried by the pillars 183. Encircling the shaft 197 between the sleeves 195 and 196 is a coil spring 198 which has one end anchored to a longitudinally extending brace bar 199 carried by and laterally projecting from the pillars 183. The other end of the spring 198 is secured to the oscillatable plate 192 with said spring so arranged as to yieldably urge and retain the oscillatable plate in the position illustrated in Figs. 14, 15 and 18.

Figure 16:
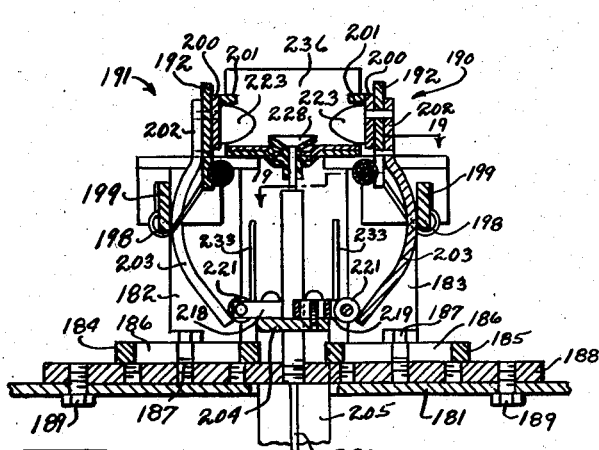
Fig. 16 is a sectional view of the parts illustrated in Fig. 15 with said parts in their final box setting up positions.
Figure 17:
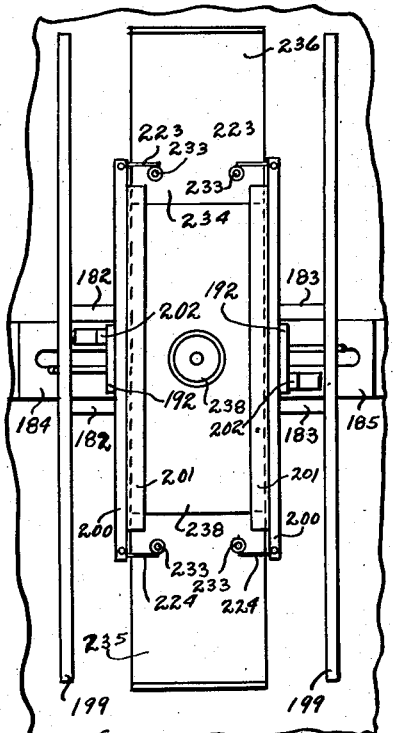
Fig. 17 is a top plan view of Fig. 16 showing the parts in their final box setting up positions.

Secured to the plate 192 on its upper or inner surface is the box wall lifting and positioning plate 200 which has a length substantially equal to the length of the box side outer wall member 46 between its end defining scores. Outwardly projecting from the upper end of said plate 200 is a lip 201 normal to said plate 200 and adapted to engage with the box side top wall member 45 during its erection. The height of the box wall lifting and folding plate 200, when in its final upright folding position, as illustrated in Figs. 16 and 17, is substantially equal to the height of said box side outer wall member 46 and with the lip 201 in engagement with the said box side top wall member 45.

The oscillatable plate 192 has pinned or otherwise secured to its lower or outer surface an operating member 202 which depends therefrom and is provided with a curved tail or cam portion 203 whose lower end projects laterally of the machine.

Figure 13:
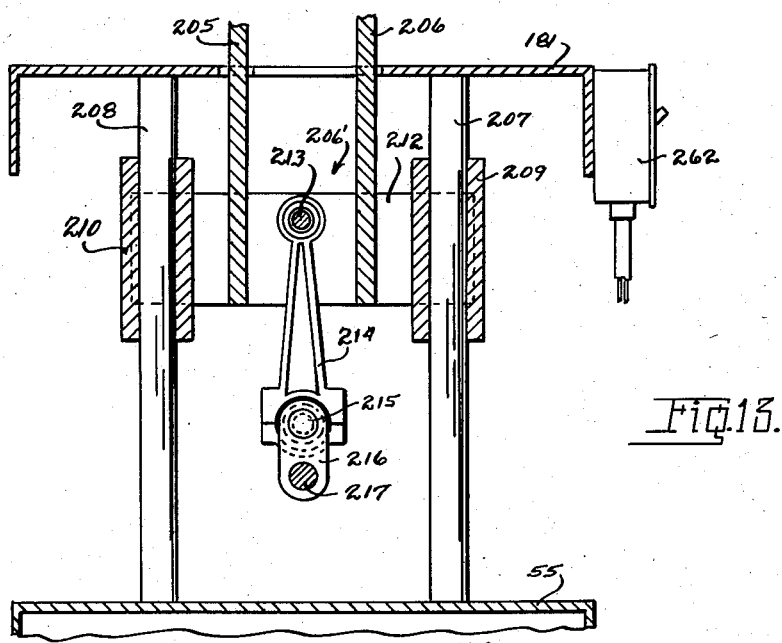
Fig. 13 is an enlarged vertical sectional view through the actuating mechanism for the box setting up mechanism as seen from line 13—13 on Fig. 1.
Figure 12:
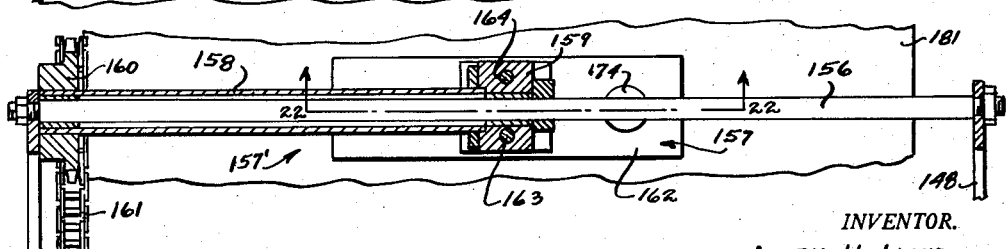
Fig. 12 is an enlarged fragmentary horizontal view through the operating end of the transfer mechanism as seen from line 12—12 on Fig. 1.

Disposed beneath the box setting up mechanism 146 is an operating plate 204 secured to the upper ends of vertically reciprocal posts 205 and 206. The posts 205 and 206 are adapted to be operatively reciprocated by a mechanism similar, in all respects, to that which operates the box blank transfer mechanism and includes a crosshead 206' illustrated in Figs. 3, 13 and 14.

It is to be understood that this box setting up mechanism actuating device may take any suitable or desirable construction, that shown in the drawings, as noted above, comprising a cross-head that includes a pair of upstanding circular posts or rods 207 and 208 on which is mounted the cross-head guides comprising sleeves 209 and 210, respectively, on rods 207 and 208 with said sleeves joined to one another by side plates 211 and 212. Pivotally mounted between the said side plates 211 and 212, as by pin 213, is the upper end of a connecting rod 214. The connecting rod 214 has its lower end journaled on crank pin 215 of a crank arm 216, in turn keyed or otherwise secured to a second projecting end 217 of shaft 110 projecting from the speed reducer, crank shaft 111. The cross-head plates 211 and 212 have secured between them the lower ends of the reciprocating posts 205 and 206 to partake of the reciprocations of the said cross-head and impart said reciprocating movement to the operating plate 204.

Mounted on the plate 204 substantially midway of its length is a pair of longitudinally adjustable blocks 218 and 219 which in their construction and appurtenances are identical for respectively operating the box side wall lifting and positioning mechanisms 190 and 191. Each of the blocks 218 and 219 is provided longitudinally thereof with an elongated aperture 220, see Fig. 19, through which a clamp screw extends into the plate 204 and whereby the blocks are axially adjustable. The outer end of each of the blocks 218 and 219 is furcated to provide arms between which is journaled a roller 221 respectively overlying the operating lever 202 of the box sides lifting and folding mechanisms 190 and 191.

Figure 15:
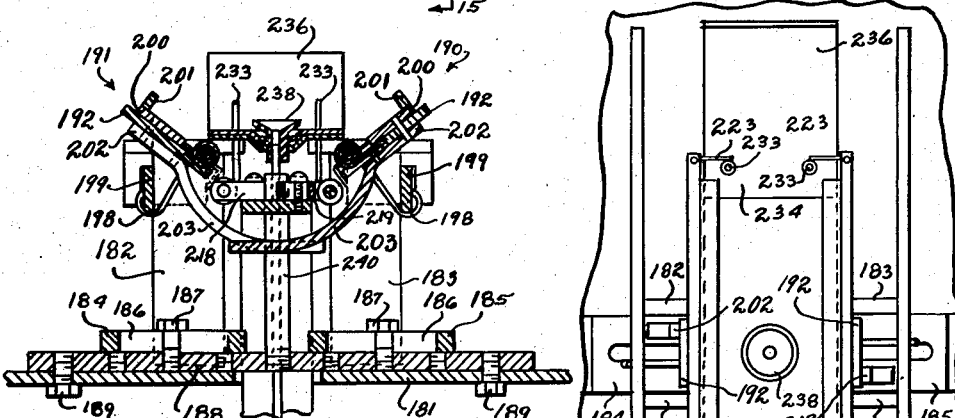
Fig. 15 is a sectional view taken at right angles to Fig. 14 as seen from line 15—15 on said Fig. 14.

The operation of the parts thus far set forth is as follows:

The downward reciprocation of the plate 204 through the blocks 219 and 220, and particularly through the rollers 221 thereof, engages the cam portions 203 of operating levers 202 for causing the box sides folding mechanisms 190 and 191 to be respectively oscillated about the axis of its shaft or pin 197 and to be actuated from the positions illustrated in Figs. 15 and 18 to the positions illustrated in Figs. 16 and 17. This operation of the box sides folding means is against the resistance of their springs 198.

The box side wall lifting and positioning plate 200 has its opposite ends furcated as illustrated in Fig. 21, for one end of said plate, to provide arms between which is received a hinge sleeve 222 projecting from a wing 223; there being a similar wing 224 at the opposite end of the plate 200. Each of the wing sleeves is in alignment with an aperture in the arms of its plate furcated end and through which aligned apertures extends pivot pins 225 and 226 with each of said pivot pins having secured to its wing sleeve to partake of its oscillation, as will presently be made clear. The wing pivot pins extend below the plate 200 each to have its lower end terminate just above the operating plate 204 with said terminal or lower end bent as at 227 to receive a weighted circular head 228. Each of the weighted circular heads 228 is adapted to cooperate with an incline or cam face 229 at one end of a cam block 230 secured to and inwardly projecting from the brace bar 199, as clearly illustrated in Figs. 20 and 21.

The purpose of the wings 223 and 224 and the mechanism carried thereby is for the purpose of positioning the tucking flaps 49 and the bellows corner pieces 48 transversely of the carton bottom panel during the setting up of the box or carton side walls and this mechanism operates as follows: With the parts in the positions illustrated in Figs. 14, 15, 18, 20, and 21, the wings 223 and 224 extend outwardly of the plates 200 in planes parallel with the said plates 200. As the plates 200 are raised from their lower or relatively horizontal position in Fig. 15 to their upward or vertical positions in Fig. 16, the weighted head 228 of each wing pivot pin 225 follows and maintains contact with the cam block, cam face 229, wich causes said hinge pins to be rotated in a direction to cause the said wings 222 and 223 of each plate 200 to be projected toward the corresponding wing of the other box side folding plate 200, or each of said wings to be at right angles to its plate 200, as shown clearly in Figs. 16 and 17.

Mounted on the operating plate 204 near its outer ends are blocks 231, each of which is provided with an elongated aperture 232 through which a securing bolt or screw passes and through which the said blocks may be axially as well as angularly adjusted. Upstanding from each of said blocks 231 is a pin 233 which in the normal position of the machine, that is, the position to receive a box blank for set up, is projected to a point above the lower ends of the box side wall lifting and positioning mechanisms 190 and 191, as illustrated in Fig. 15. Since the said pins 231 are carried by the operating plate 204 they will move therewith for a purpose as will subsequently be made clear.

Secured to and mounted on the upper ends of the pillars 182 and 183 is a box blank support or table 234 having an effective area substantially equal to the area of the box blank bottom panel 35, with said table 234 having outwardly of its effective area upwardly bent or arched ends 235 and 236. Disposed on said table 234 is a plate 237 of substantially the same width as the table 234 but of less length than the effective area of the table 234. The purpose for the plate 237, as will later be made clear, is to provide clearance at the ends of the box while being set up and sufficient freedom to permit the end walls tucking flaps 43 to be inserted beneath the ends 50 of the sidewall panels 47.

Substantially centrally of the table 234 it is provided with a flexible suction cup 238 which holds the blank during the entire setting up or erection thereof. The suction cup 238 has connected with its lower end, one end of a flexible tube 239 which passes through a protecting sleeve 240 secured in and upstanding from the elongated plate 188.

The suction tube 239 has its other end connected to valve block 179 and through which the suction in said tube 239 and the suction cup 238 is controlled.

In practice, the suction is alternately connected with the transfer head and its suction cup assemblies 173 and 174 and the folding mechanism and its suction cup 238. In order to accomplish this, the valve block 179 has reciprocal therein, as noted above, a piston type valve 180 having formed intermediate its ends a pair of reduced portions 241 and 242. Said reduced portions are adapted to alternately connect a suction or pressure port 243 in said valve block 179 with ports 244 and 245, respectively, with which are connected the opposite ends of tubes or conduits 178 and 239. The valve block 179 is further provided with ports 246 and 247 respectively connectible with ports 244 and 245 when the said ports are not connected with the pressure port 243. The pressure port 243 has connected therewith one end of a flexible conduit 248 which has its other end connected to the suction end 249 of a suction pump 250. The suction pump 250 is mounted on a swinging bracket 251 carried by the bed legs 56 through a pivot 252. The suction pump 250 is driven through a belt or the like 253 by a motor 254, carried by the bracket 251.

As was noted above, the valve 240 has two operative positions and the said valve is retained in its positions by a spring detent mechanism 255 carried in part by the valve block 179 and in part by the valve itself.

Upwardly of the valve block 179, the valve 180 is provided with a stem 256 on which is adjustably positioned stops 257 and 258. The stops 257 and 258 are conveniently lock nuts on the threaded valve stem 256. The valve stem 256 extends through a passageway 259 in a valve actuator 269 which is secured to and moves with the box blank transfer mechanism cross-head plate 104. The passageway 259, as seen in Fig. 3, is in the form of a notch or recess of such a dimension as to straddle the valve stem 256 but engage with the stops 257 and 258.

The valve actuator 260 and the stops of the valve are so positioned as to be operated when the box carton transfer mechanism is at its opposite ends of operation wherefore the suction is applied to the transfer head suction cups 171 and 172 at the moment when a box blank is to be removed from the stack and said suction is connected with the box folding mechanism at the completion of the transfer and at the time the folding mechanism is being operated.

As seen in Fig. 1, the belt 113 for driving the crosshead operating crank shafts is connected with the motor 254 and the tension in said belt is effected and maintained by the downward swing of the bracket 251 on its pivotal mounting 252.

As further illustrated in Fig. 1 the suction pump 250 has connected therewith a pump inlet 261 which is of the usual construction for filtering the intake air.

While it is believed that the operation of the box folding machine of the present invention is fully understood from the foregoing, the said operation and method of setting up a box is briefly as follows:

A supply of knocked down box blanks is mounted on the platform 57 between the uprights 117 thereon and the guide upright 118 upstanding from the bed 55 and with said platform in its lowermost position, namely, with its block 58 disposed on the upper end of the cylinder 61. The motor 254 is then started which may be under the control of a switch 262, see Fig. 13, secured to and carried by the box folding mechanism shelf 181 with the operator stationed at the left hand end of the machine as illustrated in Fig. 1. The parts are illustrated in the drawings in operative positions just after depositing a blank on the folding mechanism table 234—237.

The motor 254 simultaneously actuates the suction pump 250 and speed reducer or crank shaft 111 which simultaneously actuates the box blank transfer mechanism cross-head 100' and the folding mechanism crosshead 206'. The crankshaft cranks are angularly offset from one another so as to operate alternately, that is, while the transfer mechanism is returning to the stack for a new blank the folding mechanism is operating to raise and position the box walls of the blank deposited thereon. The box blank transfer mechanism cross-head 100' during its upward movement, through the member 99 and its fingers 97 and 98, operates the flexible rack 90 for operating the drive shaft 87 and actuating shaft 92 and disposing the transfer mechanism head 157 on the uppermost blank of the stack. When the cross-head 100' reaches its upper limit of travel, the valve actuator 260 engages stop 258 for shifting the valve 180 to the opposite position from that illustrated in Fig. 24 for connecting the suction with the transfer head suction cups 171 and 172. The said transfer mechanism cross-head 100' has its direction of movement immediately reversed, or moved downward, whereupon the flexible rack actuates the transfer mechanism 86 to the box folding mechanism 146. At about the time the transfer movement is complete and the box blank is on the folding mechanism table 234—237, the transfer mechanism cross-head 100' has reached its lower limit of travel and through the valve actuator 260 engages stop 257 for returning the valve 180 to the position shown in the drawings, thereby cutting off the suction from the conduit 178 and connecting same with the conduit 239 and the folding mechanism suction cup 238.

At the same time and during the last portion of the downward movement of the transfer mechanism crosshead 100', it, through the treadle 114, actuates the pump lever 75 for displacing hydraulic medium in the pump plunger sleeve 65 to upwardly actuate piston 69 and platform 57. The upward movement of the platform 57 through the blank uppermost thereon actuates valve trigger 132 and through the rod or stem 125 operates linkage 132 for operating valve 142 and permit an accurate positioning of the upper surface of the stack with respect to the machine.

Figure 14:
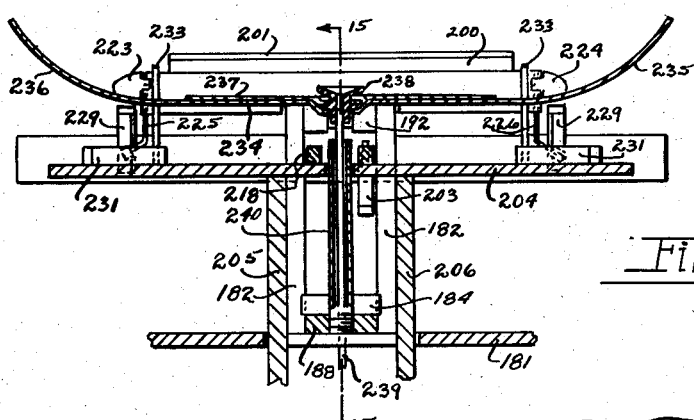
Fig. 14 is an enlarged fragmentary sectional view through the box setting up mechanism operated by the mechanism of Fig. 13 as seen from line 14—14 on Fig. 1.

At the time of the delivery of a box blank to the box folding mechanism the parts are in their normal positions as illustrated in Figs. 14, 15 and 18. The placement of the box blank on the table 234—237 causes the pins 233 to engage the box blank inner wall member panels 40 beyond the score or fold lines 36 and 38 and thereby raise the end wall extensions to be normal to the said table 234—237 and normal to the box blank bottom panel 35. This positioning of the parts of the box blank includes the substantially vertical positioning of the flaps or bellows corners 48 normal to the box blank bottom panel 35.

At this time the box folding mechanism cross-head 206' is started downwardly for carrying with it, through the members 205 and 206, the plate 204. The initial movement of the plate 204 carries with it the pins 231 for freeing the box blank end walls panels but which panels are now engaged by the operator through the engagement of the tucking flaps 43 and outer end wall panels 42. In other words, at this time the operator is manually tending to outwardly fold the said tucking flaps and outer end wall members for eventual final positioning.

As noted above, the downward movement of the box folding mechanism cross-head 206' occurs during the upward movement of the transfer mechanism cross-head 100' and shortly after the initial downward movement of the box folding mechanism cross-head 206', it, through its actuators 218 and 219, engages the cam-like arms 203 of the box blank side wall folding plates 200 for actuating them from their outward positions to their upright positions. In other words, the said box blank side walls folding plates 200 are actuated from their normal positions to their final positions as illustrated in Figs. 16 and 17.

Immediately upon the movement of the box side walls folding plates from their positions in Fig. 15, the wings 223 and 224, at the ends of said folding plates 200, are actuated inwardly of their plates 200 from the positions in Fig. 18 to the positions in Fig. 17, the movement of these wings being effected through the weighted ends 228 on the wings actuating pins 225 in co-operation with the cam faces 229 of blocks 230.

The parts are in their final box setting up positions when the folding mechanism cross-head 206' reaches its lower limit of travel and at which time the plate 204 is in the position as illustrated in Fig. 16. As the said parts reach this lower limit the operator has completed the hand folding of the end walls outer wall members to the positions illustrated in the right-hand end of Fig. 27 and as illustrated in cross-section in Fig. 28.

It should be noted that the hinge shafts or pins 197 for the box sides folding mechanisms 190 and 191 are located slightly below the upper surface of the folding mechanism table 234—237, wherefore with the parts in the positions illustrated in Figs. 14 and 15 the fingers 201 have more space between them than the folded or knocked-down blank is wide. As the said folding mechanisms are actuated to their folding positions, this space between the fingers narrows until the said folding mechanisms are in their final box folding positions, as illustrated in Figs. 16 and 17, at which time the box wall lifting plates 200 are in their substantially vertical positions. At this time the fingers 201 are in contact with the box walls top wall members and the said plates 200 with their fingers 201, during the final movement thereof, solidly engaging the box wall members for crowding or forcing same to their final positions, that is, the side walls inner and outer wall members vertically of the box bottom and the top wall members parallel with said box bottom.

The box folding mechanism cross-head 206' is, upon reaching its lower limit of movement, substantially, immediately, reversed thereby immediately raising the plate 204 and causing the actuators 218 and 219 to be retracted from the plates cam-like arms 203 so that the springs 198 may retract the said plates 200 from the positions illustrated in Figs. 16 and 17. At about the time the box folding mechanism cross-head 206' reaches its lowermost limit of travel the transfer mechanism cross-head 100' is at its uppermost limit of travel and has, therefore, shifted the valve 180 to the position opposite to that illustrated in Fig. 24 for thereby cutting off the suction to the box folding mechanism suction cup 238 and connecting same with the transfer head suction cups 171 and 172. Therefore, as soon as the box folding mechanism cross-head 206' starts upwardly and relieves the box blank side folding plates 200, so that they may be returned to their normal position, the lips 201 clear the now fully erected box side walls and permit the removal of the fully erected box from the machine.

It will be understood, that the operator, while completing the erection of the end walls outer wall members disposes and inserts the tucking flaps of the box blank end walls beneath the ends 50 of the glue flap-panels 47. It should be noted that this movement and folding of the end walls outer wall members and tucking flaps is guided by the upwardly arched ends 235 and 236 of table 234.

The above cycle of operation is repeated with each box blank until the stack of box blanks on the platform 258 is exhausted.

From the foregoing it is believed now apparent that there has been provided a new and novel method of erecting knocked-down boxes as well as a new and novel machine for practicing the method or process.

What is claimed is:

1. In a box setting up machine for setting up a box blank that includes a bottom panel and integrally, hingedly connected opposed end walls including an inner and an outer wall member and integrally, hingedly connected opposed side walls having, in combination, a supporting table of an area substantially equal to the area of and receiving the box blank bottom panel, retaining means on said table for engaging and retaining the box blank bottom panel on said table, retractable means upstanding from said table for engaging the opposed end walls inner wall members of the box blank during placement thereof on the table for raising same to be normal to the table and box blank bottom panel, oscillatable plates hingedly mounted adjacent the edges of the table for movement to positions substantially normal to said table and box blank bottom panel for correspondingly positioning the box blank walls, vertically reciprocable means for actuating said hinged plates, said box blank end walls outer wall members each being adapted to be folded outwardly of the box against its inner wall member, and means retracting said end wall inner wall members raising means below the table so that said box blank end walls outer wall members may be folded against their said inner wall members.

2. In a box setting up machine for setting up a box blank that includes a bottom panel, integrally, hingedly connected opposed end walls including an inner and an outer wall member, integrally, hingedly connected opposed side walls, and integrally, hingedly connected flaps at the ends of said opposed side and end walls having, in combination, a supporting table of an area substantially equal to the area of and receiving the box blank bottom panel, retractable means placing and positioning a box blank with its bottom panel on the box blank supporting table, retaining means on said table for engaging and retaining the box blank bottom panel on said table, retractable means upstanding from said table for engaging the opposed end walls inner wall members of the box blank during placement thereof on the table for raising same to be normal to the table and box blank bottom panel, oscillatable plates hingedly mounted adjacent the edges of the table for movement to positions substantially normal to the said table and box blank bottom panel for correspondingly positioning the box blank remaining opposed walls, vertically reciprocable means for actuating said hinged plates, a pivotally mounted wing at each corner of the table oscillatably carried by the hinged plates, means operable during the oscillation of said hinged plates for oscillating the wings to positions normal to and transversely of the table and box blank bottom panel for correspondingly positioning the box blank flaps, said box blank end walls outer wall members each being adapted to be folded outwardly of the box against its inner wall member and transversely disposed flaps, and means retracting said end walls inner wall members raising means below the table so that said box blank end walls outer wall members may be folded against their said inner wall members and transversely disposed flaps.

3. In a box setting up machine for setting up a box blank that includes a bottom panel, integrally, hingedly connected opposed end walls, integrally, hingedly connected opposed side walls, and integrally, hingedly connected flaps at the ends of said opposed side and end walls having, in combination, a supporting table of an area substantially equal to the area of and receiving the box blank bottom panel, retaining means on said table for engaging and retaining the box blank bottom panel on said table, means upstanding from said table engaging two opposed walls of the box blank during placement thereof on the table for raising same to be normal to the table and box blank bottom panel, oscillatable plates hingedly mounted adjacent the edges of the table for movement to positions substantially normal to the said table and box blank bottom panel for correspondingly positioning the box blank remaining opposed walls, vertically reciprocable operating means for actuating said hinged plates, a pivotally mounted wing at each corner of the table oscillatably carried by the hinged plates, means operable during the oscillation of said hinged plates for oscillating the wings to positions normal to and transversely of the table and box blank bottom panel for correspondingly positioning the box blank flaps, said first pair of opposed walls upstanding positioning means being retractable and connected with the means for actuating the hinged plates for retraction during the oscillation of the hinged plates, and means for sequentially operating the vertically reciprocable operating means for alternately oscillating the hinged plates and retracting the upstanding positioning means.

4. In a box setting up machine for setting up a box blank that includes a bottom panel and integrally, hingedly connected opposed end walls including an inner and an outer wall member and integrally, hingedly connected opposed hollow side walls, respectively, including an inner wall member, an outer wall member and a top wall member, having, in combination, a supporting table of an area substantially equal to the area of and receiving the box blank bottom panel, retractable means placing and positioning a box blank with its bottom panel on the box blank supporting table, retaining means on said table for engaging and retaining the box blank bottom panel on said table, retractable means upstanding from said table for engaging the opposed end walls inner wall members of the box blank during the placement thereof on the table for raising the same to be normal to the table and box blank bottom panel, oscillatable plates hingedly mounted adjacent the edges of the table for movement to positions substantially normal to said table and box blank bottom panel for engaging the opposed side walls outer wall members and correspondingly positioning the box blank side walls, the said plates having a height somewhat greater than the height of the said box blank side walls, a finger normal to and carried by each of said plates for engaging the box blank side wall top wall members for positioning same parallel to the box blank panel and supporting table, vertically reciprocable means for actuating said hinged plates, said box blank end walls outer wall members each being adapted to be folded outwardly of the box against its inner wall member, and means retracting said end wall inner wall members raising means below the table so that said box blank end walls outer wall members may be folded against their said inner wall members.

5. In a box setting up machine for setting up a box blank that includes a bottom panel, integrally, hingedly connected opposed end walls including an inner and an outer wall member, integrally, hingedly connected opposed hollow side walls, respectively, including an inner wall member, an outer wall member and a top wall member and integrally, hingedly connected flaps at the ends of said opposed side walls members and end walls, having, in combination, a supporting table of an area substantially equal to the area of and receiving the box blank bottom panel, retractable means placing and positioning a box blank with its bottom panel in the box blank supporting table, retaining means on said table for engaging and retaining the box blank bottom panel on said table, retractable means upstanding from said table for engaging the opposed end walls inner wall members of the box blank during the placement thereof on the table for raising the same to be normal to the table and box blank bottom panel, oscillatable plates hingedly mounted adjacent the edges of the table for movement to positions substantially normal to said table and box blank bottom panel for engaging the opposed side walls outer wall members and correspondingly positioning the box blank side walls, the said plates having a height somewhat greater than the height of the said box blank side walls, a finger normal to and carried by each of said plates for engaging the box blank side wall top wall members for positioning same parallel to the box blank bottom panel and supporting table, vertically reciprocable means for actuating said hinged plates, a pivotally mounted wing at each corner of the table oscillatably carried by the hinged plates, means operable during the oscillation of said hinged plates for oscillating the wings to positions normal to and transversely of the table and box blank bottom panel for correspondingly positioning the box blank flaps, said box blank end walls outer wall members each being adapted to be folded outwardly of the box against its inner wall member and transversely disposed flaps, and means retracting said end walls inner wall member raising means below the table so that said box blank end walls outer wall members may be folded against their said inner wall members and transversely disposed flaps.

6. In a box setting up machine for setting up a box blank that includes a bottom panel, integrally, hingedly connected opposed end walls, integrally, hingedly connected opposed hollow side walls, respectively, including an inner wall member, an outer wall member and a top wall member and integrally, hingedly connected flaps at the ends of said opposed side walls members and end walls, having, in combination, a supporting table of an area substantially equal to the area of and receiving the box blank bottom panel, retaining means on said table for engaging and retaining the box blank bottom panel on said table, means upstanding from said table for engaging the opposed end walls of the box blank during the placement thereof on the table for raising the same to be normal to the table and box blank bottom panel, oscillatable plates hingedly mounted adjacent the edges of the table for movement to positions substantially normal to said table and box blank bottom panel for engaging the opposed side walls outer wall members and correspondingly positioning the box blank side walls, the said plates having a height somewhat greater than the height of the said box blank side walls, a finger normal to and carried by each of said plates for engaging the box blank side wall top wall top wall members for positioning same parallel to the box blank bottom panel and supporting table, vertically reciprocable means for actuating said hinged plates, a pivotally mounted wing at each corner of the table oscillatably carried by the hinged plates, means operable during the oscillation of said hinged plates for oscillating the wings to positions normal to and transversely of the table and box blank bottom panel for correspondingly positioning the box blank flaps, said opposed end walls upstanding positioning means being retractable and connected with the means for actuating the hinged plates for retraction during the oscillation of the hinged plates, and means for sequentially operating the vertically reciprocable operating means for alternately oscillating the hinged plates and retracting the upstanding positioning means.

7. In a box setting up machine for setting up a box blank that includes a bottom panel, integrally, hingedly connected opposed end walls, respectively including an inner and an outer wall member, integrally, hingedly connected opposed hollow side walls, respectively, including an inner wall member, an outer wall member, and a top wall member and integrally, hingedly connected flaps at the ends of said opposed side walls members, having, in combination, a supporting table of an area substantially equal to the area of and receiving the box blank bottom panel, retaining means on said table for engaging and retaining the box blank bottom panel on said table, means upstanding from said table for engaging the opposed end walls of the box blank during the placement thereof on the table for raising the same to be normal to the table and box blank bottom panel, oscillatable plates hingedly mounted adjacent the edges of the table for movement to positions substantially normal to said table and box blank bottom panel for engaging the opposed side walls outer wall members and correspondingly positioning the box blank side walls, the said plates having a height somewhat greater than the height of the said box blank side walls, a finger normal to and carried by each of said plates for engaging the box blank side wall top wall members for positioning same parallel to the box blank bottom panel and supporting table, vertically reciprocable means for actuating said hinged plates, a pivotally mounted wing at each corner of the table oscillatably carried by the hinged plates, means operable during the oscillation of said hinged plates for oscillating the wings to positions normal to and transversely of the table and box blank bottom panel for correspondingly positioning the box blank flaps, said end walls outer wall members being adapted to be disposed outwardly and downwardly of the end walls inner wall members after the positioning of the flaps transversely of the table, and guide means carried by the table for guiding the end walls outer wall members to their operative positions.

8. In a box setting up machine for setting up a box blank that includes a bottom panel, integrally, hingedly connected opposed end walls, respectively including an inner and an outer wall member, integrally, hingedly connected opposed hollow side walls, respectively, including an inner wall member, an outer wall member, and a top wall member and integrally, hingedly connected flaps at the ends of said opposed side walls members, having, in combination, a supporting table of an area substantially equal to the area of and receiving the box blank bottom panel, retaining means on said table for engaging and retaining the box blank bottom panel on said table, means upstanding from said table for engaging the opposed end walls of the box blank during the placement thereof on the table for raising the same to be normal to the table and box blank bottom panel, oscillatable plates hingedly mounted adjacent the edges of the table for movement to positions substantially normal to said table and box blank bottom panel for engaging the opposed side walls outer wall members and correspondingly positioning the box blank side walls, the said plates having a height somewhat greater than the height of the said box blank side walls, a finger normal to and carried by each of said plates for engaging the box blank side wall top wall members for positioning same parallel to the box blank bottom panel and supporting table, vertically reciprocable means for actuating said hinged plates, a pivotally mounted wing at each corner of the table oscillatably carried by the hinged plates, means operable during the oscillation of said hinged plates for oscillating the wings to positions normal to and transversely of the table and box blank bottom panel for correspondingly positioning the box blank flaps, said opposed end walls upstanding positioning means being retractable and connected with the means for actuating the hinged plates for retraction during the oscillation of the hinged plates, means for sequentially operating the vertically reciprocable operating means for alternately oscillating the hinged plates and retracting the upstanding positioning means, said end walls outer wall members being adapted to be disposed outwardly and downwardly of the end walls inner wall members after the positioning of the flaps transversely of the table, and guide means carried by the table for guilding the end walls outer wall members to their operative positions.

9. In a box setting up machine for setting up a box blank that includes a bottom panel having side and end walls integrally, hingedly, connected with its edges, the combination of a bed, a box blank receiving and supporting table carried by and upwardly of said bed with said table of an area substantially equal to the area of the box blank bottom panel, means associated with said box blank receiving and supporting table for positioning the side and end walls of the box blank normal to the box blank bottom panel, an upright from said bed spaced from the box blank supporting and receiving table, an oscillatable box blank transfer means oscillatably mounted on said upright with said transfer means including releasable box blank carrying means depositing and positioning the box blank on the supporting and receiving table, said box blank walls positioning means including oscillatable plates carried by the box blank receiving and supporting table, releasable means holding the box blank bottom panel on the receiving and supporting table during the operation of the oscillatable plates, and means for sequentially actuating the box blank transfer releasable carrying means and the supporting and receiving table box blank releasable holding means whereby the transfer means releasable carrying means is released after depositing and positioning the box blank bottom panel on the receiving and supporting table and prior to the operation of the receiving and supporting table holding means.

10. In a box setting up machine for setting up a box blank that includes a bottom panel having side and end walls integrally hingedly connected with its edges, the combination of a bed, a box blank receiving and supporting table carried by and upwardly of said bed with said table of an area substantially equal to the area of the box blank bottom panel, means associated with said box blank receiving and supporting table for positioning the side and end walls of the box blank normal to the box blank bottom panel, an upright from said bed spaced from the box blank supporting and receiving table, an oscillatable box blank transfer means oscillatably mounted on said upright with said transfer means including releasable box blank carrying means depositing and positioning the box blank on the receiving and supporting table, said box blank walls positioning means including oscillatable plates carried by the box blank receiving and supporting table, releasable means holding the box blank bottom panel on the receiving and supporting table during the operation of the oscillatable plates, power actuated means for actuating the oscillatable plates, power actuated means for oscillating the transfer means, means coordinating the operation of the box blank transfer means and box setup oscillatable plates whereby said power means are actuated in timed relation, and means operable by one of said power actuated means for sequentially actuating the box blank transfer releasable carrying means and the supporting and receiving table box blank releasable holding means whereby the transfer means releasable holding means is released after depositing and positioning the box blank bottom panel on the receiving and supporting table and prior to the operation of the receiving and supporting table holding means.

11. In a box setting up machine for setting up a box blank that includes a bottom panel having side and end walls integrally hingedly connected with its edges, the combination of a bed, a box blank receiving and supporting table carried by and upwardly of said bed with said table of an area substantially equal to the area of the box blank bottom panel, means associated with said box blank receiving and supporting table for positioning the side and end walls of the box blank normal to the box blank bottom panel, an upright from said bed spaced from the box blank supporting and receiving table, an oscillatable box blank transfer means oscillatably mounted on said upright with said transfer means including releasable box blank carrying means depositing and positioning the box blank on the supporting and receiving table, said box blank walls positioning means including oscillatable plates carried by the box blank receiving and supporting table, releasable means holding the box blank bottom panel on the receiving and supporting table during the operation of the oscillatable plates, said transfer means box blank releasable carrying means including a suction cup, said receiving and supporting table box blank releasable holding means including a suction cup, means operating said box blank oscillatable transfer means and said oscillatable box blank walls raising plates in sequence, a source of suction, and means including valve means connecting said source of suction and the suction cups with said valve means operable by one of said transfer means and oscillatable box blank walls oscillatable plates actuating means for sequentially rendering the transfer means suction cup and box receiving and supporting table suction cup operative and inoperative.

12. In a box setting up machine for setting up a box blank that includes a bottom panel having side and end walls integrally hingedly connected with its edges, the combination of a bed, a box blank receiving and supporting table carried by and upwardly of said bed with said table of an area substantially equal to the area of the box blank bottom panel, means associated with said box blank receiving and supporting table for positioning the side and end walls of the box blank normal to the box blank bottom panel, an upright from said bed spaced from the box blank supporting and receiving table, an oscillatable box blank transfer means oscillatably mounted on said upright with said transfer means including releasable box blank carrying means depositing and positioning the box blank on the receiving and supporting table, said box blank walls positioning means including oscillatable plates carried by the box blank receiving and supporting table, releasable means holding the box blank bottom panel on the box blank bottom receiving and supporting table during the operation of the oscillatable plates, actuating means for said box blank walls positioning oscillatable plates and actuating means for said oscillatable transferring means each including a vertically reciprocable crosshead, a crank for vertically reciprocating each cross-head, a crank shaft between said cross-heads actuating means whereby said cross-heads are actuated in timed relation to one another for sequentially depositing a box blank on the box blank supporting and receiving table and actuating the oscillatable plates for raising the box side walls, and means actuated by one of said cross-heads for sequentially actuating the box blank transfer releasable carrying means and the supporting and receiving table box blank releasable holding means whereby the transfer means releasable carrying means is released after depositing and positioning the blank bottom panel on the receiving and supporting table and prior to the operation of the receiving and supporting table holding means.

13. In a box setting up machine for setting up a box blank that includes a bottom panel, integrally, hingedly, connected opposed end walls, and integrally, hingedly, connected opposed side walls, having, in combination, a supporting table of an area substantially equal to the area of and receiving the box blank bottom panel, retaining means on said table for engaging and retaining the box blank bottom panel on said table, oscillatable plates hingedly mounted adjacent the edges of the table for movement to positions substantially normal to said table and box blank bottom panel for correspondingly positioning the box blank walls, a cross-head mounted for rectilinear movement normal to the supporting table and having a normal position at the upper end of its stroke, an upstanding post from said cross-head, laterally projecting blocks at the upper end of the post, a cam finger downwardly projecting from each oscillatable plate to underlie the laterally projecting blocks, and a crank for downwardly actuating the cross-head and its post to effect an engagement between the oscillatable plates cam fingers and laterally projecting blocks to oscillate the plates to their positions normal to the supporting table.

14. In a box setting up machine for setting up a box blank that includes a bottom panel, integrally, hingedly, connected opposed end walls, and integrally, hingedly, connected opposed side walls, having, in combination, a supporting table of an area substantially equal to the area of and receiving the box blank bottom panel, retaining means on said table for engaging and retaining the box blank bottom panel of said table, oscillatable plates hingedly mounted adjacent the edges of the table for movement to positions substantially normal to said table and box blank bottom panel for correspondingly positioning the box blank walls, a cross-head mounted for rectilinear movement normal to the supporting table and having a normal position at the upper end of its stroke, an upstanding post from said cross-head, laterally projecting blocks at the upper end of the post, a cam finger downwardly projecting from each oscillatable plate to underlie the laterally projecting blocks, a crank for downwardly actuating the cross-head and its post to effect an engagement between the oscillatable plates cam fingers and laterally projecting blocks to oscillate the plates to their positions normal to the supporting table, and yieldable means for reversely oscillating the plates upon upward actuation of the cross-head.

15. In a box setting up machine for setting up a box blank that includes a bottom panel, integrally, hingedly, connected opposed end walls, and integrally, hingedly, connected opposed side walls, having, in combination, a supporting table of an area substantially equal to the area of and receiving the box blank bottom panel, retaining means on said table for engaging and retaining the box blank bottom panel of said table, oscillatable plates hingedly mounted adjacent each of two opposite edges of the table for movement to positions substantially normal to said table and box blank bottom panel for correspondingly positioning two opposed walls of the box blank, vertically reciprocable means including a plate located below the box blank supporting table, said vertically reciprocable means having a normal position at the upper end of its reciprocations, upwardly projecting pins from said plate upstanding above said supporting table for positioning the remaining box blank walls normal to the box blank bottom panel, cam means connecting each oscillatable plate with the vertically reciprocable means, and power actuated for downwardly reciprocating the plate for simultaneously actuating the oscillatable plates and retracting the box blank walls positioning pins.

16. In a box setting up machine for setting up a box blank that includes a bottom panel, integrally, hingedly, connected opposed end walls, and integrally, hingedly, connected opposed side walls, having, in combination, a supporting table of an area substantially equal to the area of and receiving the box blank bottom panel, retaining means on said table for engaging and retaining the box blank bottom panel of said table, oscillatable plates hingedly mounted adjacent each of two opposite edges of the table for movement to positions substantially normal to said table and box blank bottom panel for correspondingly positioning two opposed walls of the box blank, vertically reciprocable means including a plate located below the box blank supporting table, said vertically reciprocable means having a normal position at the upper end of its reciprocations, upwardly projecting pins from said plate upstanding above said supporting table for positioning the remaining box blank walls normal to the box blank bottom panel, cam means connecting each oscilatable plate with the vertically reciprocable means, power actuated for downwardly reciprocating the plate for simultaneously actuating the oscillatable plates and retracting the box blank walls positioning pins, and yieldable means for reversely oscillating the plates upon upward movement of the vertically reciprocable means.

References Cited in the file of this patent

UNITED STATES PATENTS

| | | |
|---|---|---|
| 834,080 | Shearn | Oct. 23, 1906 |
| 2,017,583 | Burrow | Oct. 15, 1935 |
| 2,341,521 | Baker et al. | Feb. 15, 1944 |
| 2,362,853 | Spiller et al. | Nov. 14, 1944 |
| 2,389,480 | Baker | Nov. 20, 1945 |
| 2,458,341 | Cake | Jan. 4, 1949 |
| 2,518,014 | Inman | Aug. 8, 1950 |
| 2,624,248 | Baker et al. | Jan. 6, 1953 |
| 2,654,601 | Williams | Oct. 6, 1953 |